Feb. 18, 1941.  W. L. MORRISON  2,232,184
VENTILATING DEVICE FOR AUTOMOBILES
Original Filed Sept. 22, 1933   3 Sheets-Sheet 1
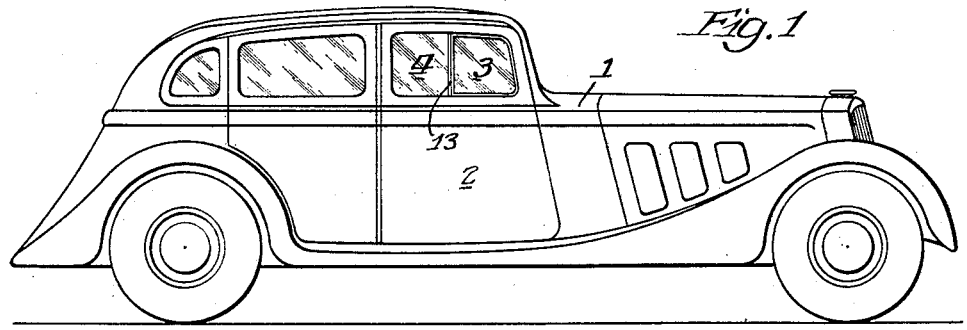
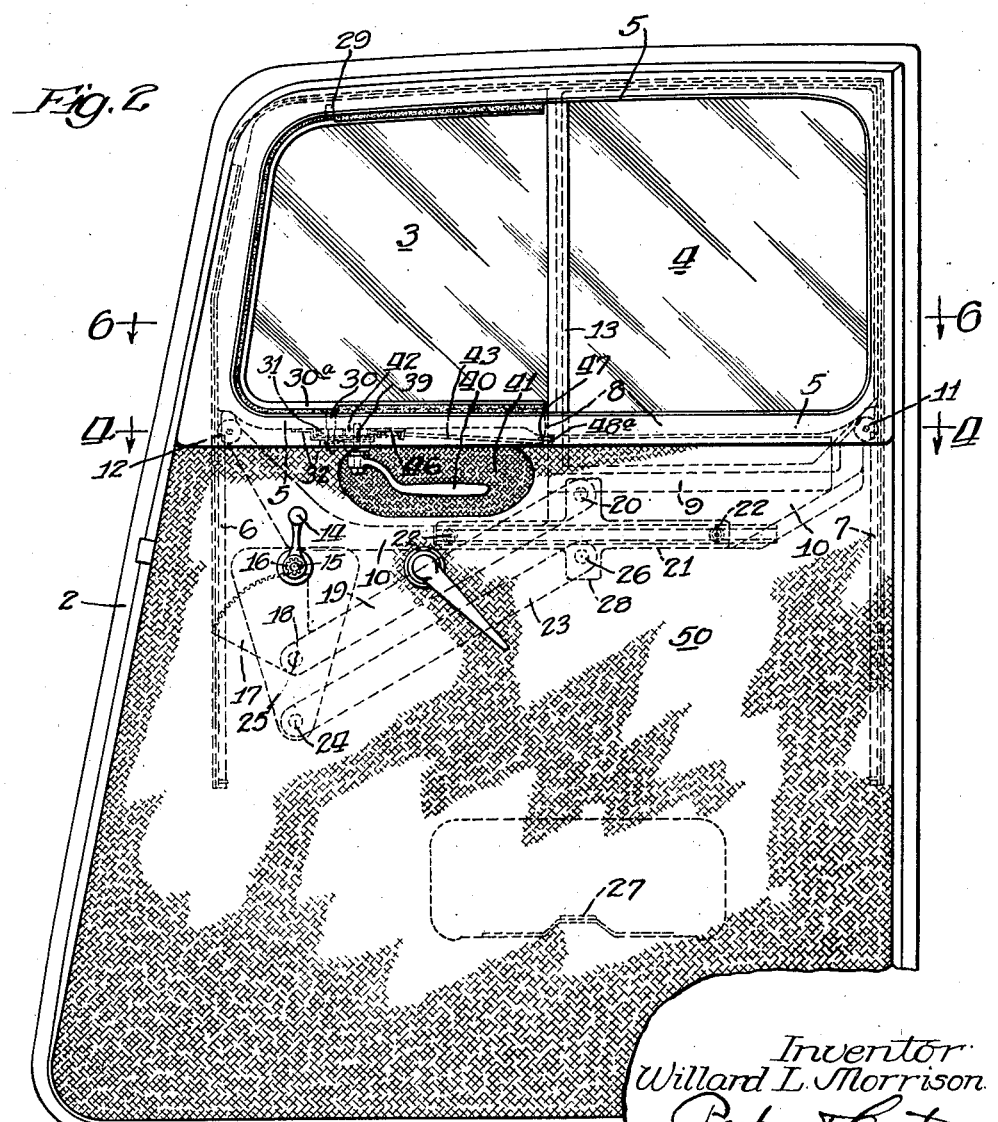
Inventor
Willard L. Morrison
By Parker & Carter
Attys.

Feb. 18, 1941.   W. L. MORRISON   2,232,184
VENTILATING DEVICE FOR AUTOMOBILES
Original Filed Sept. 22, 1933   3 Sheets-Sheet 2
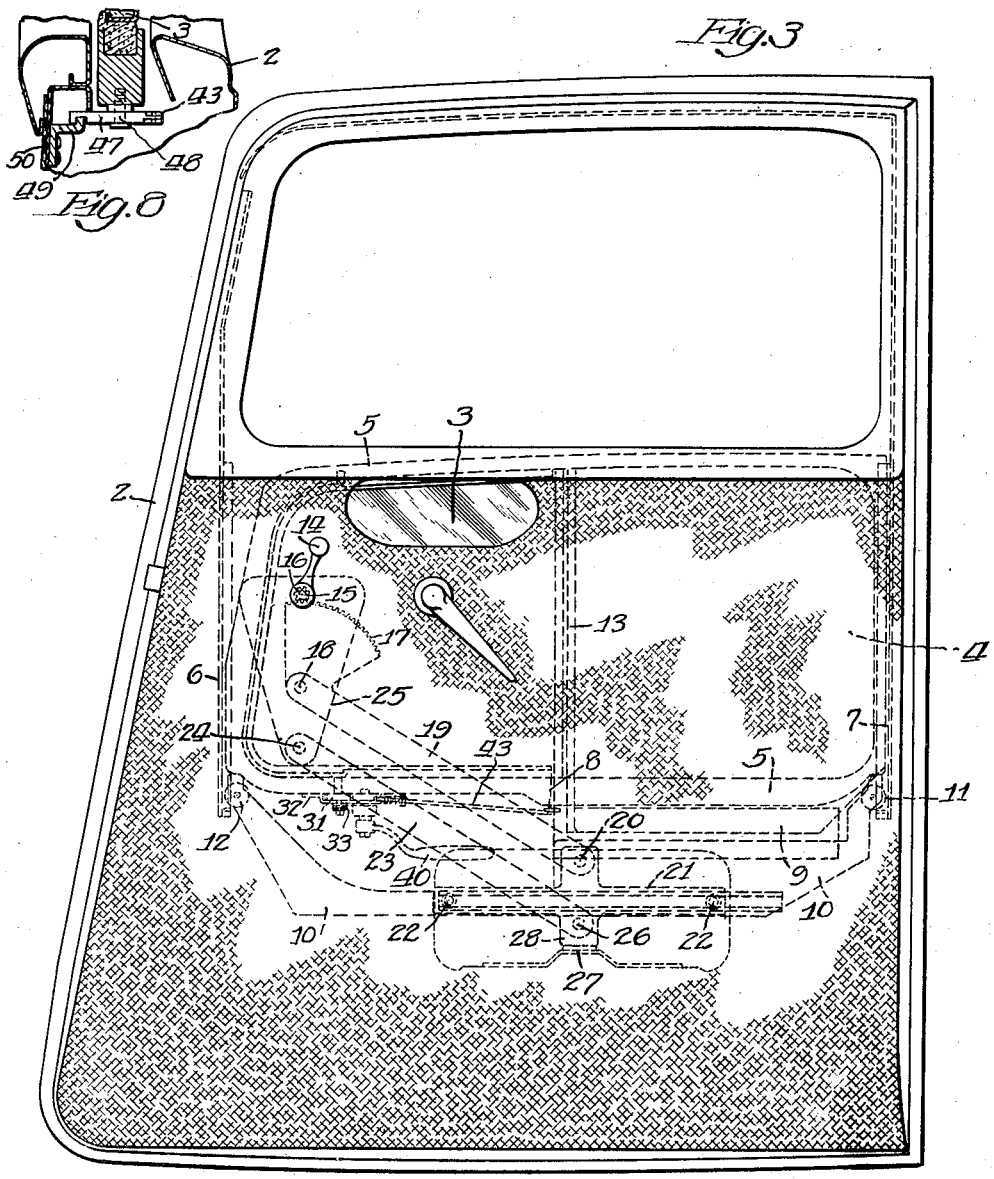
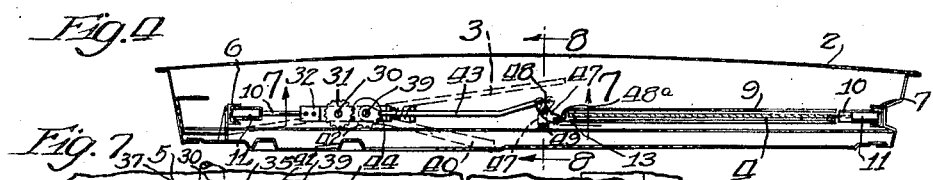
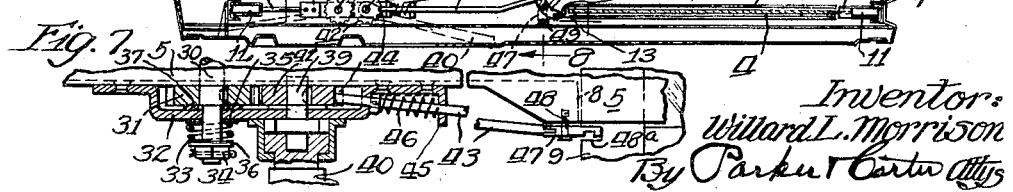
Inventor:
Willard L. Morrison
By Parker & Carter Attys Feb. 18, 1941. W. L. MORRISON 2,232,184
VENTILATING DEVICE FOR AUTOMOBILES
Original Filed Sept. 22, 1933   3 Sheets-Sheet 3
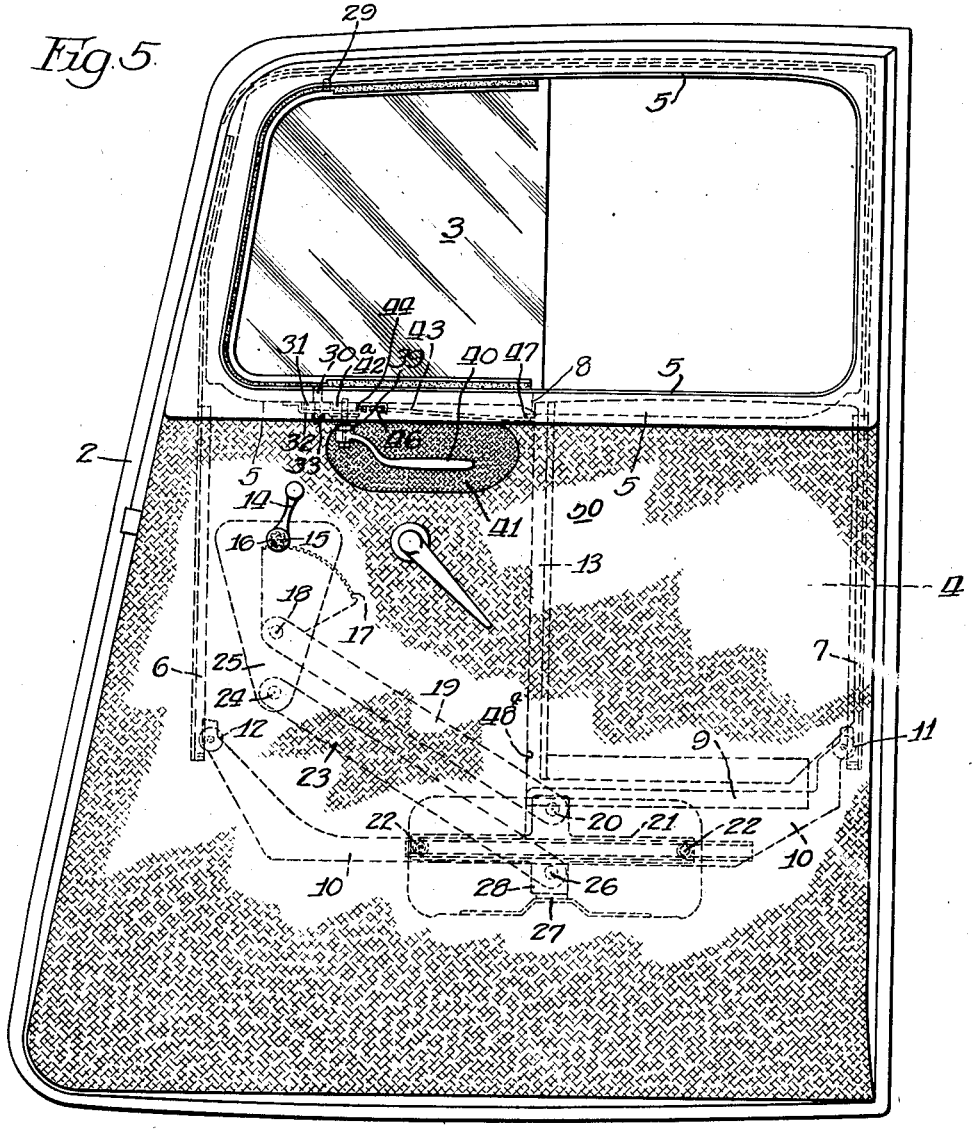
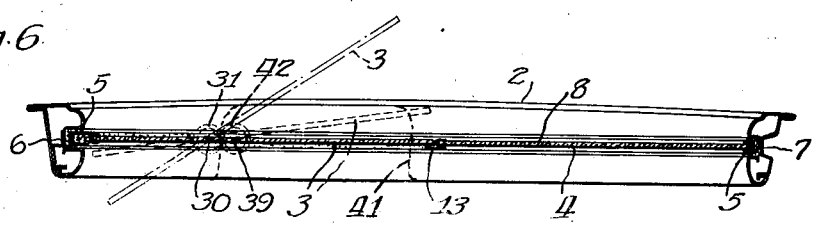
Inventor:
Willard L. Morrison
By Parker & Carter attys Patented Feb. 18, 1941

2,232,184

UNITED STATES PATENT OFFICE 2,232,184

VENTILATING DEVICE FOR AUTOMOBILES

Willard L. Morrison, Lake Forest, Ill.

Application September 22, 1933, Serial No. 690,591
Renewed June 1, 1939

7 Claims. (Cl. 296—44)

This invention relates to ventilating devices for automobiles and has for its object to provide a new and improved device of this description. The invention has as a further object to provide a ventilating device with a sliding window and a pivoted window, wherein one or both may be moved down out of the way. The invention has as a further object to provide a ventilating device wherein there is a movable frame for the window which may be moved down out of the way and which may be releasably locked to some part of the fixed structure. The invention has other objects which are more particularly pointed out in the accompanying description.

Referring now to the drawings,

Fig. 1 is a view of an automobile having one form of ventilating device embodying the invention;

Fig. 2 is an inside view of one of the doors of the automobile illustrated in Fig. 1, showing the two windows in their up closed positions;

Fig. 3 is a view similar to Fig. 2 showing both windows in their down positions;

Fig. 4 is a sectional view taken on line 4—4 of Fig. 2;

Fig. 5 is a view similar to Fig. 1 showing the pivoted window in its up position and the other window in its down position;

Fig. 6 is a sectional view taken on line 6—6 of Fig. 2;

Fig. 7 is a sectional view taken on line 7—7 of Fig. 4, with parts omitted;

Fig. 8 is an enlarged sectional view taken on line 8—8 of Fig. 4, with parts omitted.

Like numerals refer to like parts throughout the several figures.

In the drawings I have illustrated an automobile 1 provided with the ventilating device embodying the invention. The automobile is provided with doors 2 on opposite sides thereof in the usual manner, and the ventilating device is mounted in these doors. This ventilating device, as herein shown, consists of the two windows 3 and 4 mounted in a frame 5 which extends entirely around the windows, the frame being movably mounted in the door. The frame 5 is arranged so that the entire frame may slide downwardly along the guides 6 and 7 at the opposite sides of the door. The frame 5 at its bottom at the rear is provided with a slot 8 through which the window 4 may pass. The window 4 is connected at the bottom to a supporting member 9, which in turn is connected to a cross member 10 which extends across under both windows 3 and 4 and which engages the guides 6 and 7. This cross member is preferably provided with rollers 11 and 12 which engage the guides 6 and 7. This permits the use of short guides. The rollers can be omitted by making a longer or extended engagement between the cross member and the guides.

A sealing device 13 is provided between the adjacent edges of the windows which seals the space between them when both windows are in their closed positions. This sealing device is connected with the rear window so that it moves down with this window. Some suitable means is provided for moving the window 4 down. In the construction herein shown this is done by means of a crank 14 on a shaft 15 which is provided with a pinion 16. The pinion 16 engages a toothed segment 17 pivoted at 18 and to which is connected a bar 19 pivotally connected at 20 to a carriage or sliding member 21 mounted on the cross member 10 and preferably having rollers 22 which engage said cross member. There is a second bar 23 pivotally connected at 24 to a fixed part 25, the other end being connected at 26 with the carriage or movable member 21. When the crank 14 is turned in one direction the cross member 10 and the glass 4 are moved down to the position shown in Fig. 5. This downward movement is stopped by a laterally projecting supporting member 27 upon which the projecting part 28 of the sliding member rests, as shown in Fig. 5. During this movement the window 4 moves down through the slot 8 in the frame 5 and the frame 5 stays in its up position. The window 3 is pivotally mounted in the frame 5, there being an upper pivot 29 and a lower pivot 30. The lower pivot 30 is preferably fixed to the window 3 in any desired manner, as by being fixed to the member 30a connected with the glass of the window. The lower pivot projects through the frame 5 and is provided with a pinion 31, see Fig. 7. This pivot also projects through a bracket 32 attached to the frame 5.

Some means is associated with the window 3 to resist its pivotal movement and to maintain it in any position to which it is moved. In the construction shown this is produced by a friction device comprising a spring 33 surrounding the pivot 30. A nut 34 is on the threaded end of the pivot 30, and when tightened compresses the spring. Friction washers 35 and 36 are located between the spring and the nut and the bracket 32. There is also preferably a friction washer 37 between the pinion 31 and the bracket 32. The pivot 30 has a shoulder 38 which engages this friction washer 37. The pinion 31 also engages it.

Some means is provided for rotating the pivot 30 from inside the automobile. There is also preferably means for preventing the window being rocked about its pivot from the outside of the automobile. In the drawings I have shown a particular construction for this purpose. In this construction there is a shaft 39 to which is connected a handle 40. When the window 3 is in its closed position this handle 40 extends substantially parallel to the frame 5 and is located beneath this frame. There is an opening 41 in the wall of the door by means of which access to the handle 40 is secured. Connected with the shaft 39 is a pinion 42 which engages the pinion 31 so that when the handle 40 is moved the pivot 30 and the window 3 will be moved.

Some means is provided for connecting the window 4 with the frame 5 and disconnecting it from said frame, and for connecting the frame with a fixed part on the automobile. As herein shown this is done by moving the handle 40. The pinion 42 has teeth only on a part of its periphery, the remaining portion being smooth. A member 43 has its end normally engaging the periphery of the pinion 42 and normally in a recess 44 therein. This member passes through the bracket 32. This bracket has an extension 45 through which the rod 43 passes. There is a spring 46 which normally presses the rod against the pinion 42. The member 43 is connected to a latch 47 which is pivoted at 48 to the frame 5. When the windows are closed this latch is received in a notch 48a in the frame associated with the window 4 and holds said window in the frame. In this position the member 43 has its end in the notch 44. When the handle 40 is moved, the end of the member 43 is moved out of the notch on to the periphery of the pinion 42 and this moves the member 43 longitudinally so as to rock the latch 47 about the pivot 48 and disconnect it from the notch 48a in the frame of the window 4 and connect it with the fastening member 49 attached to the wall 50 of the automobile door. There is a clutch mechanism associated with the shaft 39 and the pinion 42 which prevents the backward movement of the parts by applying pressure to the window 3. I have not shown this in detail in this application as it is described and claimed in detail in a separate application executed of even date herewith.

When it is desired to move the rear window 4 downwardly the handle 40 is moved to disconnect the latch 47 from the window 4 and connect it with the locking device 49. At the same time the window 4 is partially moved about its pivot so that a part of it will be out over the reveal and the latch prevents the downward movement of the frame and the window 3. The handle 14 is then rotated and this lowers the window 4 through the slot 8 in the frame 5 to the position shown in Fig. 5. The window 3 may then be moved to any desired position about its pivotal connection with the frame. The window 4 may be moved up to its closed position by rotating the handle 14 in the opposition direction. When the two windows are in their closed position the window 4 is locked to the frame 5 by the rod 48. When it is desired to lower both of the windows it is only necessary to rotate the handle 14, and since both windows are fastened to the frame 5, this will lower the entire frame and the parts will be in the position shown in Fig. 3. It will be noted that the sealing device moves down with the window 4 so as to be out of the way when the window 4 is moved down alone, and it will be seen that when the entire frame is moved down, a complete open space is provided.

I claim:

1. A ventilating device for automobiles comprising a slidable window frame adapted to slide up and down, two windows in said frame, one pivotally connected with said slidable window frame and the other slidable therein, moving mechanism for moving the sliding window up and down independent of said frame, an actuating mechanism for rocking said pivoted window about its pivotal points, and means for connecting and disconnecting said moving mechanism and said window frame, said means actuated by the said actuating mechanism which rocks said pivoted window.

2. A ventilating device for automobiles comprising a slidable window frame adapted to slide up and down, two windows in said frame, one pivotally connected with said slidable window frame and the other slidable therein, moving mechanism for moving the sliding window up and down independent of said frame, an actuating mechanism for rocking said pivoted window about its pivotal points, and means for connecting and disconnecting said moving mechanism and said window frame, said means actuated by the said actuating mechanism which rocks said pivoted window, said actuating mechanism for said pivoted window having a handle on the inside of the automobile and which extends substantially parallel with said window frame when the pivoted window is in its closed position.

3. A ventilating device for automobiles comprising a slidable window frame adapted to slide up and down, two windows in said frame, one pivotally connected with said slidable window frame and the other slidable therein, moving mechanism for moving the sliding window up and down independent of said frame, an actuating mechanism for rocking said pivoted window about its pivotal points, and means for connecting and disconnecting said moving mechanism and said window frame, said means actuated by the said actuating mechanism which rocks said pivoted window, said means forming a part of said actuating mechanism for the pivoted window.

4. A ventilating device for automobiles comprising a window, a pivot projecting in a substantially vertical direction from said window, a handle operatively connected with the pivot of said pivoted window, said handle moving about a substantially vertical axis, the wall below the pivoted window being recessed, said handle located in said recess and extending substantially parallel with the window frame when the pivoted window is in its closed position, so as to be out of the way.

5. A ventilating device for automobiles comprising a section having a substantially vertically extending pivot connected therewith so that it may be moved to different angular positions, said section moving about an up and down axis, said pivot extending through the window frame, a shaft at one side of said pivot and substantially parallel thereto operatively connected with said pivot, a recess in the wall below said window frame into which the end of said shaft projects and a substantially horizontally extending handle having one end connected with said shaft, said handle located in said recess and extending substantially parallel with said wall when the pivoted window is in its closed position.

6. A ventilating device for automobiles comprising a window having a pivot connected therewith, by means of which it is pivotally mounted in position, a wall below the window, said wall being recessed, a substantially horizontal movable handle moving about a substantially vertical axis when the window is moved to its open and closed positions and located in said recess so as to be out of the way and operatively connected with the pivot, for moving the pivoted window.

7. A ventilating device for automobiles comprising a window adapted to be moved from a closed to a ventilating position and back to a closed position, a wall below said window, said wall provided with a recess, a handle located in said recess so as to be out of the way, said handle operatively connected at one end with said window, for moving it from its closed position to its ventilating position and back to its closed position, a fixed axis about which said handle moves in moving said window to its open or closed position, said handle remaining in substantially the same horizontal plane in all its various positions.

WILLARD L. MORRISON.